United States Patent Office 3,335,033
Patented Aug. 8, 1967

1

3,335,033
METHOD OF MAKING ELECTRIC BATTERY ELECTRODES

Frederick P. Kober, Bayside, N.Y., assignor to General Telephone and Electronics Laboratories, Inc., a corporation of Delaware No Drawing. Filed Aug. 27, 1964, Ser. No. 392,615
17 Claims. (Cl. 136—29)

This invention relates to a method of manufacturing electric battery electrodes and, in particular, to a method of making positive electrodes for secondary alkaline batteries.

In the manufacture of an alkaline battery of the nickel-cadmium type, the positive electrode in each cell is conventionally formed by immersing a porous nickel plaque in a solution of nickel nitrate and leaving it in the bath until the pores of the plaque have become impregnated with the solution. The plaque is then removed from the nitrate bath and placed in a solution of potassium or sodium hydroxide where it is cathodically polarized. By cathodically polarized, it is meant that the nickel plaque is made negative with respect to a counter electrode immersed in the hydroxide bath. As a result, hydroxyl ions are formed within the pores of the plaque, the nickel ions combining with excess hydroxyl ions in the solution to form nickel hydroxide. After the cathodic polarization is completed, the plaque is removed from the bath, thoroughly washed and dried.

In order to obtain sufficient nickel hydroxide within the pores of the positive electrode, it has been found necessary to repeat this procedure five or more times. It is important that the nitrate solution not be contaminated by the hydroxide bath and therefore careful washing and handling of the impregnated plaque is essential during each cycle. Accordingly, the process tends to become time consuming and expensive.

Another difficulty with the present method of impregnating electrodes is that it leads to contamination of the active material by nitrate ions. As a result, nickel-cadmium batteries having electrodes made by this process often have poor shelf life.

Accordingly, it is an object of my invention to provide an improved method of making positive electrodes for alkaline storage batteries. This method requires only a single bath rather than the repeated use of two solutions as in the conventional process.

Another object is to provide a method for making positive electrodes which are relatively free of nitrate ion contamination.

Still another object is to provide a method for producing positive electrodes which is less expensive and simpler to carry out than known methods and which may be employed in high capacity alkaline storage batteries capable of discharge at high rates.

The objects of my invention are accomplished by the anodic polarization of an electrically conducting porous matrix in a solution of ammine nickel ions. As a result of the anodic polarization, the pores of the matrix are impregnated with an insoluble nickel compound consisting essentially of nickel hydroxide. More specifically, the process comprises immersing a sintered nickel plaque in a concentrated solution of ammine nickel complex ions and then anodically polarizing the plaque to convert the complex ions to nickel hydroxide.

The term "plaque" refers to an electrically conductive porous structure for use as a support for the active material in a nickel-cadmium secondary cell. It is usually made of sintered nickel powder although metal wool, felted metal fiber or graphite may also be used. One method of making the plaque consists of heating fine

2 nickel powder (such as powder prepared by the decomposition of nickel carbonyl) in a reducing atmosphere until the particles adhere to one another and to a nickel screen support web. The porosity of plaques suitable for use as battery electrodes is approximately 80 percent.

The ammine nickel solution is prepared by dissolving a soluble nickel salt, such as nickel formate $Ni(HCOO)_2$ or nickel acetate $Ni(CH_3COO)_2$, in a saturated solution of ammonium hydroxide $NH_4OH$ to form the soluble ammine nickel complex $Ni(NH_3)_x^{++}$, where $2 \leqq x \leqq 6$. The value of $x$ is determined by the concentration of ammonia in solution and is made as close to six as possible. The formation of the soluble nickel complex is not limited to the use of ammonia as the complexing agent, other agents such as ethylene diamine, triethylene tetramine, and diethylene triamine also being suitable for this purpose. Other soluble nickel salts may also be used but these should be chosen so as to minimize the incorporation of undesirable impurities such as nitrate and chloride ions.

In one specific embodiment of the invention, the ammine nickel complex is prepared by dissolving nickel formate powder in a saturated (28%) ammonium hydroxide solution. Sufficient nickel formate is dissolved in the ammonium hydroxide to obtain an ammine nickel solution which is saturated at room temperature, the specific gravity being in the range 1.23 to 1.25.

A 15% solution of potassium hydroxide may be added to the ammine nickel solution in the ratio of one part potassium hydroxide to two parts ammine nickel solution. Although the reaction will proceed without it, the addition of potassium hydroxide controls the pH of the solution thereby stabilizing the reaction and improving reproducibility. Alternately, lithium hydroxide may be used in place of potassium hydroxide. While a 15% solution of either potassium or lithium hydroxide appears to give best results, the percentage may vary between 12 and 20 percent.

In order to assure that the reaction will proceed efficiently, control of the initial pH of the bath is required. The initial pH will be in excess of 7, the preferred value being between 10 and 11. The temperature of the bath is critical and should be maintained between 40° and 60° C., optimum results being obtained at about 45° C.

The nickel plaque is immersed in the ammine nickel solution together with a counter electrode which does not react with the electrolyte. Metals such as nickel, stainless steel or platinum may be used as the counter electrode. After the plaque has been immersed in the ammine nickel solution it is anodically polarized by a source of direct current, the positive terminal of the source being connected to the nickel plaque and the negative terminal to the counter electrode. The current from the D.C. source is adjusted so that the current density at the porous nickel electrode is in the range 0.4 to 1.0 ampere per square inch of apparent surface area of the nickel plaque. (Apparent surface area is defined as the area determined from the outside dimension of the plaque and does not include the surface areas of the pores.)

The current may be applied continuously or intermittently for a period required to electrolytically form nickel hydroxide within the pores of the plaque. Optimum results have been obtained by employing a direct current density of about 0.65 ampere per square inch of apparent plaque surface and applying it for periods of 25 minutes separated by five minute intervals of zero current for a total of about 20 hours. Anodic polarization for this period of time has been found to yield the desired high capacity.

Another method of anodically polarizing the plaque is to apply a current of positive polarity thereto for a given period of time and then reversing the polarity for a shorter interval. For example, good results have been obtained by connecting the positive terminal of a voltage source to the plaque and the negative terminal to the counter electrode for about 20 seconds and then reversing the polarity of the applied voltage for about one second. This process is continued until the electrode is impregnated.

The resulting impregnated plaque is then removed from the ammine nickel bath and charged in a conventional manner in a potassium or sodium hydroxide solution following which it is washed with deionized water at approximately 70° C. and dried at 80° C. Any excess ammonia which may be trapped in the pores of the plaque is removed during the charging process.

Electrodes produced by this process have been incorporated as positive electrodes in alkaline battery cells employing cadmium or zinc negative electrodes. Upon constant current discharge, it was found that the average positive electrode delivered approximately 6.0 ampere-hours per cubic inch of positive electrode.

Summarizing, the present invention provides a method of making positive electrodes for alkaline batteries in which a porous nickel plaque is impregnated with nickel hydroxide by continuous anodic polarization in an ammine nickel bath. This is in contrast to the conventional method of making positive electrodes in which the porous plaque is first immersed in a nickel nitrate solution, then cathodically polarized in a hydroxide solution, washed, dried and the process repeated several times.

As many changes could be made in the above described process it is intended that all matter contained therein shall be interpreted as illustrative and not in a limiting sense.

What is claimed is:

1. A method of producing a positive electrode for an alkaline battery comprising (a) immersing a porous nickel plaque in an ammine nickel solution having a pH in excess of 7 and a temperature in the range 40–60° C., and (b) anodically polarizing said porous nickel plaque, said anodic polarization impregnating the porces of said nickel plaque with an insoluble nickel compound consisting essentially of nickel hydroxide.

2. A method of producing a positive electrode for an alkaline battery comprising (a) preparing a solution of ammine nickel complex ions by dissolving a soluble nickel salt in a complexing agent, said solution having a pH in excess of 7 and a temperature in the range 40–60° C., (b) immersing a porous nickel plaque and a counter electrode in said solution, and (c) anodically polarizing said porous nickel plaque, said anodic polarization impregnating the pores of said nickel plaque with an insoluble nickel compound consisting essentially of nickel hydroxide.

3. A method of producing a positive electrode for an alkaline battery comprising (a) preparing a solution of ammine nickel complex ions by dissolving a soluble nickel salt in a complexing agent, said solution having a pH in excess of 7 and a temperature in the range 40–60° C., (b) immersing a porous nickel plaque and a counter electrode in said solution, and (c) connecting the positive terminal of a direct current source to said nickel plaque and the negative terminal of said source to said counter electrode, the resulting current being permitted to flow until the pores of said plaque have been substantially impregnated with nickel hydroxide.

4. A method of producing a positive electrode for an alkaline battery comprising (a) preparing a solution of ammine nickel complex ions by dissolving a soluble nickel salt in a complexing agent, said solution having a pH in excess of 7 and a temperature in the range 40–60° C., (b) immersing a porous nickel plaque and a counter electrode in said solution, and (c) connecting the positive terminal of a direct current source to said nickel plaque and the negative terminal of said source to said counter electrode, the resulting current being permitted to flow until the pores of said plaque have been substantially impregnated with nickel hydroxide, (d) removing said impregnated nickel plaque from the solution of ammine nickel complex ions, (e) immersing said impregnated plaque and a counter electrode in a hydroxide solution, and (f) anodically charging said impregnated nickel plaque.

5. A method of producing a positive electrode for an alkaline battery comprising (a) preparing a solution of ammine nickel complex ions by dissolving a soluble nickel salt selected from the group consisting of nickel formate and nickel acetate in a complexing agent selected from the group consisting of ammonium hydroxide, ethylene diamine, triethylene tetramine, and diethylene triamine, said solution having an pH in excess of 7 and a temperature in the range 40–60° C., (b) immersing a porous nickel plaque and a counter electrode in said solution, and (c) connecting the positive terminal of a direct current source to said nickel plaque and the negative terminal of said source to said counter electrode, the resulting current being permitted to flow until the pores of said plaque have been substantially impregnated with nickel hydroxide.

6. A method of producing a positive electrode for an alkaline battery comprising (a) preparing a solution of ammine nickel complex ions by dissolving a soluble nickel salt selected from the group consisting of nickel formate and nickel acetate in ammonium hydroxide, said solution having a pH in excess of 7 and a temperature in the range 40–60° C., (b) immersing a porous nickel plaque and a counter electrode in said solution, (c) connecting the positive terminal of a direct current source to said nickel plaque and the negative terminal of said source to said counter electrode, and (d) adjusting the current density to between 0.4 and 1.0 ampere per square inch of apparent surface area of said plaque, the resulting current being permitted to flow until the pores of said plaque have been substantially impregnated with nickel hydroxide.

7. A method of producing a positive electrode for an alkaline battery comprising (a) preparing a solution of ammine nickel complex ions $Ni(NH_3)_x^{++}$, where $2 \leqq x \leqq 6$ by dissolving a soluble nickel salt selected from the group consisting of nickel formate and nickel acetate in a saturated solution of ammonium hydroxide, said solution having a pH in excess of 7 and a temperature in the range 40–60° C., (b) immersing a porous nickel plaque and a counter electrode in said solution, (c) connecting the positive terminal of a direct current source to said nickel plaque and the negative terminal of said source to said counter electrode, and (d) adjusting the current density to between 0.4 and 1.0 ampere per square inch of apparent surface area of said plaque, the resulting current being permitted to flow until the pores of said plaque have been substantially impregnated with nickel hydroxide.

8. A method of producing a positive electrode for an alkaline battery as defined by claim 7 wherein the pH of said solution of ammine nickel complex ions is between 10 and 11.

9. A method of producing a positive electrode for an alkaline battery as defined by claim 8 wherein the value of $x$ is substantially equal to 6 and the pH of said solution of ammine nickel complex ions is between 10 and 11.

10. A method of producing a positive electrode for an alkaline battery comprising (a) preparing a solution of ammine nickel complex ions $Ni(NH_3)_x^{++}$, where $2 \leqq x \leqq 6$ by dissolving nickel formate in a saturated solution of ammonium hydroxide, said solution having a pH in excess of 7 and a temperature in the range 40–60° C., (b) immersing a porous sintered nickel plaque and a counter electrode in said solution, (c) connecting the positive terminal of a direct current source to said nickel plaque and the negative terminal of said source to said counter electrode, (d) adjusting the current density to between 0.4 and 1.0 ampere per square inch of apparent surface area of said plaque, the resulting current being permitted to flow until the pores of said plaque have been substantially impregnated with nickel hydroxide, (e) removing said impregnated nickel plaque from the solution of ammine nickel complex ions, (f) immersing said impregnated plaque and a counter electrode in a hydroxide solution, (g) anodically charging said impregnated nickel plaque, (h) washing said plaque in deionized water, and (i) drying said plaque.

11. A method of producing a positive electrode for an alkaline battery comprising (a) preparing a solution of ammine nickel complex ions $Ni(NH_3)_x^{++}$, where $2 \leqq x \leqq 6$ by dissolving nickel formate in a saturated solution of ammonium hydroxide, (b) adding a hydroxide solution selected from the group consisting of potassium and lithium hydroxide in the approximate ratio of one part hydroxide solution to two parts ammine nickel solution, said hydroxide solution stabilizing the pH of said ammine nickel solution, said solution having a pH in excess of 7 and a temperature in the range 40–60° C., (c) immersing a porous sintered nickel plaque and a counter electrode in said solution, (d) connecting the positive terminal of a direct current source to said nickel plaque and the negative terminal of said source to said counter electrode, (e) adjusting the current density to between 0.4 and 1.0 ampere per square inch of aparent surface area of said plaque, the resulting current being permitted to flow until the pores of said plaque have been substantially impregnated with nickel hydroxide, (f) removing said impregnated nickel plaque from said ammine nickel solution, (g) immersing said impregnated plaque and a counter electrode in a hydroxide solution, and (h) anodically charging said impregnated nickel plaque.

12. A method of preparing a positive electrode for an alkaline battery as defined by claim 11 wherein the pH of said solution of ammine nickel complex ions is between 10 and 11 and the specific gravity of said solution is between 1.23 and 1.25.

13. A method of preparing a positive electrode for an alkaline battery as defined by claim 11 wherein the concentration of said hydroxide solution is in the range 12 to 20%.

14. A method of preparing a positive electrode for an alkaline battery as defined by claim 11 wherein the temperature of said solution of ammine nickel complex ions is aproximately 45° C. and the concentration of said hydroxide solution is approximately 15%.

15. A method of producing a positive electrode for an alkaline battery comprising (a) preparing a solution of ammine nickel complex ions by dissolving a soluble nickel salt selected from the group consisting of nickel formate and nickel acetate in ammonium hydroxide, said solution having a pH in excess of 7 and a temperature in the range 40–60° C., (b) immersing a porous nickel plaque and a counter electrode in said solution, (c) connecting the positive terminal of a direct current source to said nickel plaque and the negative terminal of said source to said counter electrode, and (d) adjusting the current density to between 0.4 and 1.0 ampere per square inch of apparent surface area of said plaque and applying said current for intervals of predetermined duration separated by intervals of shorter duration, the resulting current being permitted to flow until the pores of said plaque have been substantially impregnated with nickel hydroxide.

16. A method of preparing a positive electrode for an alkaline battery as defined by claim 15 wherein the current density is approximately 0.65 ampere per square inch of apparent surface area of said plaque and the current is applied for intervals of approximately 25 minutes separated by intervals of approximately 5 minutes.

17. A method of producing a positive electrode for an alkaline battery comprising (a) preparing a solution of ammine nickel complex ions by dissolving a soluble nickel salt selected from the group consisting of nickel formate and nickel acetate in a complexing agent, said solution having a pH in excess of 7 and a temperature in the range 40–60° C., (b) immersing a porous nickel plaque and a counter electrode in said solution, and (c) connecting the positive terminal of a direct current source to said nickel plaque and the negative terminal of said source to said counter electrode, the resulting current being permitted to flow until the pores of said plaque have been substantially impregnated with nickel hydroxide.

References Cited

UNITED STATES PATENTS

| | | | |
|---|---|---|---|
| 1,442,238 | 1/1923 | Smith | 136—28.1 X |
| 2,880,257 | 4/1959 | Murphy et al. | 136—29 |
| 2,969,414 | 1/1961 | Fleischer | 136—29 |
| 3,041,388 | 6/1962 | Fukuda et al. | 136—28 XR |
| 3,146,130 | 8/1964 | Kroger et al. | 136—34 |
| 3,214,355 | 10/1966 | Kandler. | |
| 3,269,864 | 8/1966 | Ackermann | 136—29 X |

FOREIGN PATENTS

| | | |
|---|---|---|
| 623,111 | 2/1963 | Belgium. |
| 311,141 | 5/1929 | Great Britain. |
| 986,212 | 3/1965 | Great Britain. |

WINSTON A. DOUGLAS, *Primary Examiner.*

N. P. BULLOCH, *Assistant Examiner.*